Figure 1:
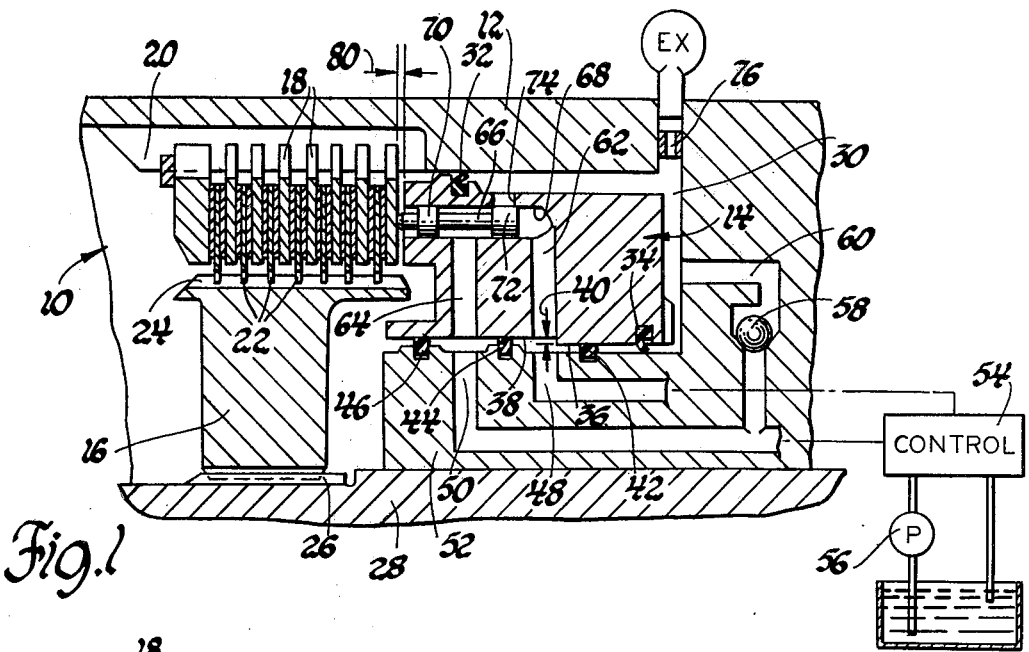

United States Patent [19]

Schuster

[11] 4,325,471
[45] Apr. 20, 1982

[54] PISTON POSITION CONTROL MECHANISM

[75] Inventor: David A. Schuster, New Boston, Mich.

[73] Assignee: General Motors Corporation, Detroit, Mich.

[21] Appl. No.: 186,860

[22] Filed: Sep. 15, 1980

[51] Int. Cl.³ .................................. F16D 25/12
[52] U.S. Cl. ............................. 192/85 AA; 188/72.3; 188/72.4
[58] Field of Search ............ 192/85 A, 85 AA, 85 C, 192/85 CA, 70.21, 106 F, 109 D, 3.57; 188/72.4, 71.5, 368, 369, 72.3; 91/52, 416

[56] References Cited

U.S. PATENT DOCUMENTS

| | | | |
|---|---|---|---|
| 3,048,247 | 8/1962 | Cook et al. | 192/85 AA |
| 3,438,472 | 4/1969 | Hillegass et al. | 192/106 F |
| 3,833,100 | 9/1974 | Aschauer | 192/85 AA |
| 3,863,746 | 2/1975 | Schulz | 192/106 F |

*Primary Examiner*—George H. Krizmanich
*Attorney, Agent, or Firm*—Donald F. Scherer

[57] ABSTRACT

A control mechanism for a disc-type friction device having a fluid operated piston including a valve member slidably disposed in the piston. The valve member is maintained in abutment with one of the disc members. The valve member is operatable to control the distribution of fluid pressure to and from the apply chamber of the friction device so that the piston is maintained at a predetermined distance from the disc member abutted by the valve member whenever the friction device is disengaged.

4 Claims, 2 Drawing Figures

U.S. Patent  Apr. 20, 1982  4,325,471

PISTON POSITION CONTROL MECHANISM

This invention relates to control mechanisms for friction drive establishing devices and more particularly for such mechanisms wherein it is desirable to maintain the apply piston at a predetermined distance from the adjacent disc member during disengagement.

One of the elements which affect shift timing in an automatic transmission is the period necessary to move the apply piston of a disc type friction device from the disengaged condition to the point where engagement commences. Due to manufacturing tolerances that can occur, this time period is a variable. In order to reduce the variability of this period, it is proposed to maintain the apply piston a predetermined distance from the position where engagement of the friction device commences. This will permit a more accurate calibration time since the amount of fluid necessary to fill the apply chamber and thereby move the piston can be readily ascertainable and substantially constant. Thus, a significant portion of the clutch apply variable will be eliminated.

It is an object of this invention to provide an improved position-sensing device for a fluid operated piston which selectively engages a disc type friction device wherein the piston is maintained a predetermined distance from the adjacent disc member during disengagement operation of the friction device.

It is another object of this invention to provide an improved position-sensing mechanism for a fluid operated piston which selectively engages a disc type friction device wherein a valve member is urged into abutment with one of the disc members and is operable to control fluid delivery to and from the apply chamber of the piston to maintain the piston a predetermined distance from the one disc member.

It is a further object of this invention to provide an improved position-sensing mechanism for a fluid operated piston which selectively engages and disengages a disc type friction device wherein a valve member slidably disposed in the piston is urged into abutment with a disc member adjacent the piston and wherein the piston is responsive to fluid pressure on a differential area to urge the piston to move toward a disengaged position which permits the valve member to deliver fluid pressure to the apply chamber of the piston thereby counteracting the pressure on the differential area for maintaining the piston at a predetermined distance from the adjacent disc member when the friction device is disengaged.

Figure 2:
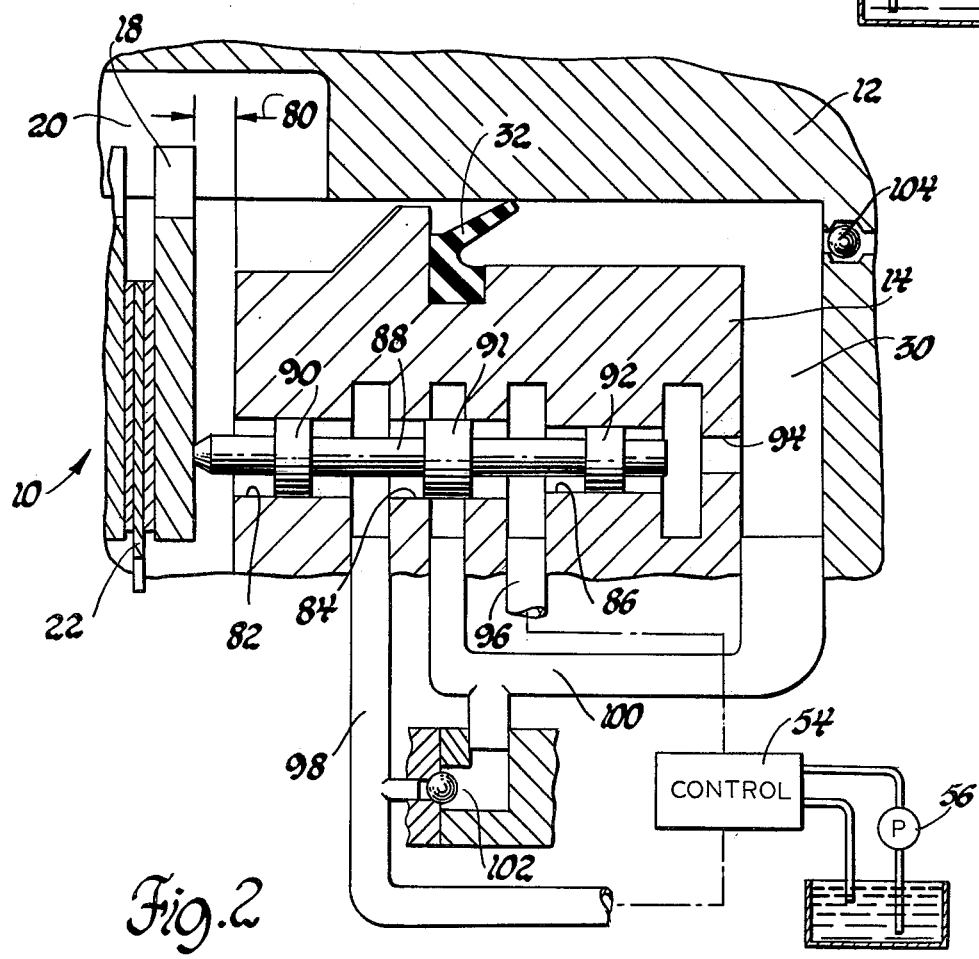

These and other objects and advantages of the present invention will be more apparent from the following description and drawings in which:

FIG. 1 is a cross-sectional diagrammatic view of one embodiment of the invention; and FIG. 2 is a diagrammatic cross-sectional view of another embodiment of the invention.

Referring in particular to FIG. 1, there is seen a disc type friction device, generally designated 10, which includes a housing 12, an annular apply piston 14 and an output hub 16. The friction device 10 also includes a plurality of disc members 18 which are drivingly connected to a spline 20 formed in the housing 12 and a plurality of disc members 22 which are interspersed among disc members 18 and drivingly connected to a spline 24 formed on the output hub 16. The output hub 16 is drivingly connected through a spline arrangement 26 to a shaft member 28 which may be operativey connected to a planetary gear set or other conventional drive transmitting mechanism. The housing 12 may be either a stationary member or a rotating member. If the housing 12 is a stationary member, the friction device 10 is a brake. If the housing 12 is a rotating member, the friction device 10 is a clutch.

The piston 14 is slidably disposed in the housing 12 and cooperates therewith to form an apply chamber 30. The apply chamber 30 is sealed at its outer diameter by a lip type seal 32 and at its inner diameter by a lip type seal 34. The inner diameter of the piston 14 has two diameters formed thereon, a diameter 36 and a larger diameter 38. These diameters 36 and 38 cooperate to form an annular differential area designated 40.

The diameter 36 is rotatable on an annular seal member 42. The larger diameter 38 is rotatable on a pair of annular seals 44 and 46. The annular seals 42 and 44 are disposed on opposite sides of a fluid passage 48 while the seals 44 and 46 are disposed on opposite sides of a fluid passage 50. The passages 48 and 50 are formed in a hub portion 52 which is integral with or otherwise formed on the housing 12. The passages 48 and 50 are in fluid communication with a conventional transmission control 54 which supplies line pressure to passage 48 and engagement control pressure to passage 50. Thus, passage 48 is continuously pressurized while passage 50 is pressurized only when it is desirable to engage the friction device 10.

The transmission control 54 is supplied with fluid pressure through a conventional pump 56 and is operable to supply the fluid pressure necessary in a well-known manner. The passage 50 is connected through a ball check valve 58 and a passage 60 with the apply chamber 30. The seals 42, 44 and 46 cooperate to prevent the fluid within the passages from intermixing and also prevent the fluid in the respective passages from communicating with atmosphere or with the apply chamber 30.

The passage 48 is in communication with a passage 62 formed in the piston 14 while the passage 50 is in communication with a passage 64 formed in the piston 14. The passages 62 and 64 are in fluid communication with a spool valve 66 which is slidably disposed in a bore 68 formed in the apply piston 14. The valve spool 66 has a pair of equal diameter lands 70 and 72 which bridge the passage 64. The land 72 is designed to be line-on-line with or slightly overlapped with a port 74 formed in the piston 14. The port 74 is in fluid communication with the apply chamber 30. It will also be noted that the apply chamber 30 is connected to exhaust through a restricted passage 76. This exhaust passage is not necessary for the invention, however it may be utilized with a rotating housing if it is desirable to prevent centrifugal pressure build-up during disengagement or to insure that the apply chamber 30 has a continual exhaust connection. In any event, the exhaust restriction 76 is a very small diameter passage so that the leakage therethrough will be minimal.

Assuming the friction device 10 is disengaged, the passage 50 will be connected to exhaust through the control 54. In this situation, line pressure in passage 48 will operate on the annular differential area 40 to urge the piston 14 to move rightward. The fluid pressure in passage 62 will operate on land 72 of valve spool 66 to move the valve spool 66 into abutment with the disc member 18 adjacent the piston 14. The piston 14 will move rightward until valve land 72 opens port 74 to permit fluid pressure to enter the apply chamber 30. Fluid pressure will increase in the apply chamber 30 until the pressure operating on differential area 40 is overcome and the piston will move leftward slightly so as to seal port 74 on valve land 72 or to maintain a slight leakage therethrough sufficient to satisfy the flow through restriction 76. In any event, the piston 14 will be maintained a predetermined distance, designated 80 from the disc 18 which is adjacent thereto.

When the control 54 is operated to cause engagement of friction device 10, passage 50 will be pressurized. The fluid pressure in passage 50 will pass through ball check 58 and passage 60 to apply chamber 30. The fluid pressure in apply chamber 30 will cause the piston 14 to move leftward until engagement of friction device 10 is completed. It is seen that engagement of the friction device 10 will be substantially commenced after the piston 14 has moved through the predetermined distance 80 and the conventional free-running clearance of the friction device 10 has been taken up. It should also be appreciated that the valve spool 66 will be inoperable during engagement of the friction device 10 since the pressure passage 64 will be equal to the pressure in the apply chamber 30. The ball check valve 58 permits the pressure in apply chamber 30 to be significantly less than line pressure during disengagement of the friction device 10 while simultaneously preventing the fluid pressure therein to be communicated to the unrestricted exhaust condition available in passage 50. Since the apply area of chamber 30 is significantly greater than the differential area 40, it will be realized that the pressure ratio between these areas will be very small.

In referring to the embodiment shown in FIG. 2, the same numerical designation will be given to components which substantially correspond to the same or similar components shown in FIG. 1. Therefore, in FIG. 2, there is seen a friction device, generally designated 10, which includes a piston 14 slidably disposed in a housing 12. The piston 14 has formed therein a stepped diameter bore 82 having a diameter portion or bore 84 and a smaller diameter portion or bore 86. A valve spool 88 is slidably disposed in the bore 82 and includes a pair of spaced equal diameter lands 90 and 91. These lands 90 and 91 are disposed in bore 84 and a smaller diameter land 92 is disposed in smaller bore 86. The right end of smaller land 92 is in fluid communication through a passage 94 with the piston apply chamber 30. The space between valve lands 91 and 92 is connected through a passage 96 which in turn is connected to line pressure through transmission control 54. The space between lands 90 and 91 is in fluid communication with a passage 98 which in turn is selectively pressurized by transmission control 54 whenever engagement of the friction device 10 is desired. The land 91 is operable to control fluid communication from either passage 96 or 98 to a passage 100 which in turn is connected to the apply chamber 30. The passage 98 is also selectively connectable with the passage 100 through a ball check valve 102. The apply chamber 30 has operatively associated therewith a conventional centrifugal ball dump valve 104. This valve 104 is operable to prevent centrifugal pressure head build-up within chamber 30 when the friction device 10 is in the disengaged condition and, it will also provide a restricted exhaust port for the apply chamber 30 during piston positioning.

The passages 96, 98 and 100 may be sealed at the inner diameter of piston 14 in a manner similar to that described above for passages 48 and 50. It will be appreciated that two additional annular seal members will have to be utilized.

Assuming the friction device 10 is disengaged, line pressure in passage 96 will operate on the differential area between valve lands 91 and 92 to urge the valve spool 88 into abutment with disc member 18 while simultaneously operating on the differential area between diameters 84 and 86 to urge the piston 14 to move to the right. In addition to the differential area between diameters 84 and 86, the differential area arrangement shown above in FIG. 1 may also be utilized if desired. In any event, sufficient relative motion between valve spool 88 and piston 14 will occur so that fluid pressure in passage 96 will be communicated through passage 100 to the apply chamber 30. The pressure in apply chamber 30 will prevent further movement of the piston 14 and will be operative to control positioning of valve land 91 relative to passage 100 so that the apply piston 14 will be maintained a predetermined distance 80 from disc member 18. If the piston attempts to move closer than the predetermined distance 80, valve land 91 will be effective to connect passage 100 to exhaust through passage 98.

When transmission control 54 calls for the selective engagement of the friction device 10, passage 98 is pressurized. Fluid pressure therein passes through ball check 102 to passage 100 and therefore apply chamber 30. The pressure in apply chamber 30 will fully engage the friction device 10 in a manner similar to that described above for FIG. 1.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An apply piston position control mechanism for a fluid operated piston which is operable in response to fluid pressure in an apply chamber to enforce engagement of a friction device such as a clutch or brake; said control mechanism comprising: a source of fluid pressure; passage means selectively connectable with said source for pressurizing the apply chamber to move said piston when engagement is desired; valve means slidably disposed in said piston and being in fluid communication with said source and said passage means; positioning means on said friction device for selectively abutting said valve means; and pressure responsive differential area means in fluid communication with said source for causing relative movement between said valve means and said piston when said piston is spaced a distance from the engagement position other than a predetermined distance when the friction device is disengaged, said valve means being operable to communicate said source with the apply chamber for moving said piston toward the engagement position until the valve means abuts said positioning means and said piston is spaced the predetermined distance.

2. An apply piston position control mechanism for a fluid operated piston which is operable in response to fluid pressure in an apply chamber to enforce engagement of a disc type friction device such as a clutch or brake; said control mechanism comprising: a source of fluid pressure; passage means selectively connectable with said source for pressurizing the apply chamber to move said piston when engagement is desired; valve means slidably disposed in said piston and being in fluid communication with said source and said passage means; positioning means defined by one of the discs in said disc type friction device being selectively abutted by said valve means; and pressure responsive differential area means in fluid communication with said source for causing relative movement between said valve means and said piston when said piston is spaced a distance from the engagement position less than a predetermined distance when the friction device is disengaged, said valve means being operable to communicate said source with the apply chamber for moving said piston toward the engagement position until the valve means abuts said positioning means and said piston is spaced a predetermined distance.

3. An apply piston position control mechanism for a fluid operated piston which is operable in response to fluid pressure in an apply chamber to enforce engagement of a selectively engageable and disengageable friction device such as a clutch or brake comprising: a source of fluid pressure; apply piston means; passage means selectively connectable with said source for pressurizing the apply chamber to move said apply piston means when engagement is desired; valve means slidably disposed in said apply piston means and being in fluid communication with said source and said passage means; positioning means on said friction device for selectively abutting said valve means; and pressure responsive annular differential area means defined by spaced circumferential surfaces of differing diameters on said apply piston means cooperating to form a projected annular area in fluid communication with said source for urging said apply piston means toward the disengaged condition of the friction device, and said valve means being operable to communicate said source with the apply chamber for moving said apply piston means toward the engagement position until the valve means abuts said positioning means and said apply piston means is spaced a predetermined distance when the friction device is conditioned for disengagement.

4. An apply piston position control mechanism for a fluid operated piston which is movable to engaged and disengaged positions to enforce selective engagement and disengagement of a friction device such as a clutch or brake comprising: a source of fluid pressure; apply piston means having an apply chamber passage means selectively connectable with said source for pressurizing the apply chamber to move said piston when engagement is desired; valve means slidably disposed in said piston means and being in fluid communication with said source and said passage means; positioning means on said friction device for selectively abutting said valve means; and pressure responsive differential area means in fluid communication with said source for urging said valve means into abutment with said positioning means and for urging said piston means toward a disengaged position, said valve means being operable to communicate said source with the apply chamber for moving said piston toward the engagement position until the valve means is abutting said positioning means and said piston is spaced a predetermined distance from the positioning means when the friction device is in the disengaged condition.

* * * * *